April 30, 1946.  C. L. DENAULT  2,399,331
ARC WELDING SYSTEM
Filed May 25, 1943
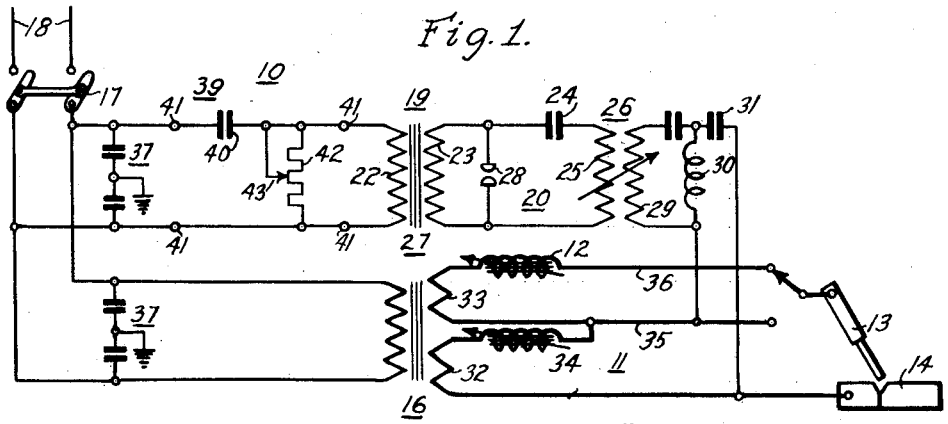
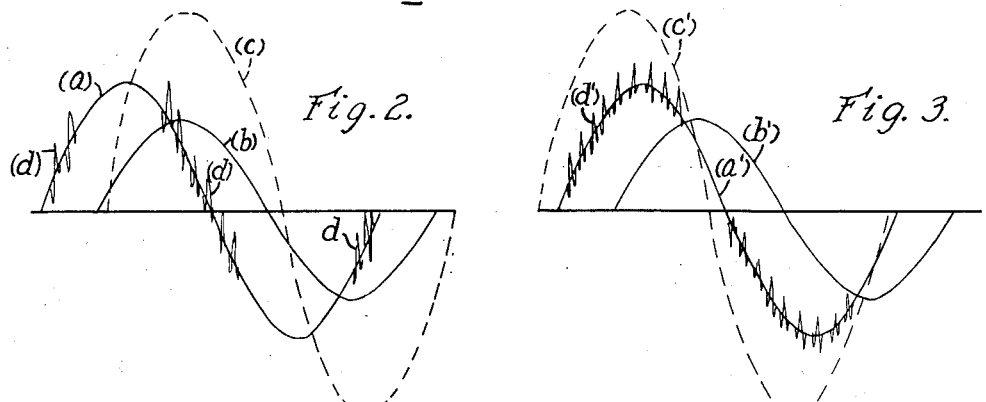
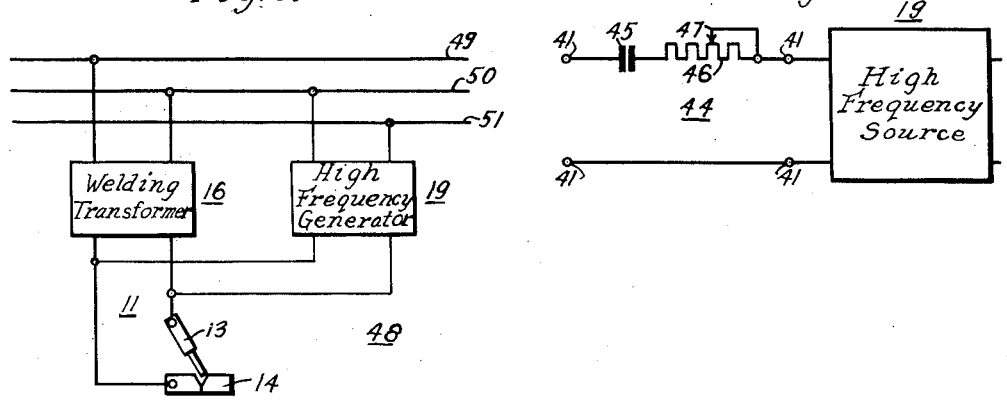
WITNESSES:
INVENTOR
Clinton L. Denault.
BY
ATTORNEY Patented Apr. 30, 1946

2,399,331

UNITED STATES PATENT OFFICE 2,399,331

ARC WELDING SYSTEM

Clinton L. Denault, Sharon, Pa., assignor to Westinghouse Electric Corporation, East Pittsburgh, Pa., a corporation of Pennsylvania Application May 25, 1943, Serial No. 488,349

5 Claims. (Cl. 315—177)

My invention relates, generally, to arc welding systems, and it has reference, in particular, to high frequency arc stabilized alternating current arc welding systems.

Generally stated, it is an object of my invention to provide for improving the stabilization of the arc in an alternating current arc welding system in a manner which is not only simple and inexpensive to effect but which also is economical and effective in operation.

More specifically, it is an object of my invention to provide for so phasing the voltage applied to an auxiliary high frequency arc stabilizing generator in its relation to the voltage applied to an arc welding circuit as to produce high frequency discharge impulses in the arc welding circuit prior to and during instants when the instantaneous value of the arc current passes through zero.

It is also an object of my invention to provide for connecting a reactance device between a high frequency generator of the gap type used for stabilizing an alternating current arc and a source of alternating current so as to shift the voltage applied to the gap of the high frequency generator substantially into phase with the arc voltage or approximately 60°–70° in advance of the normal arc current.

Another object of my invention is to provide for so connecting a high frequency generator to an alternating current source as to produce a plurality of high frequency impulses in an alternating current arc welding circuit 30°–40° prior to and during an interval in which the normal zero value of current occurs.

Still another object of my invention is to provide for so energizing a high frequency arc stabilizing circuit of the gap type as to produce a plurality of high frequency discharges commencing immediately subsequent to the time of zero arc voltage and extending beyond the normal time of instantaneous zero of the arc current.

A further object of my invention is to compensate for the phase shift of a relatively high reactance transformer used for energizing a high frequency generator in an arc stabilizing system so as to secure the maximum benefits of arc stabilization.

Other objects will in part be obvious and will in part be described hereinafter.

In practicing my invention in one of its forms, a capacitor is connected in series circuit relation with the primary winding of a high leakage reactance high voltage transformer energizing a high frequency arc stabilizing generator of the gap type which is connected to an arc welding circuit so as to shift the phase of the voltage applied to the gap of the high frequency generator by the transformer sufficiently to produce a series of high frequency discharges commencing 30°–40° prior to and lasting throughout the region of normal current zero in the arc welding circuit.

For a more complete understanding of the nature and scope of my invention, reference may be made to the following detailed description, which may be read in connection with the accompanying drawing, in which:

Figure 1 is a diagrammatic view of an arc welding system embodying the invention in one of its forms;

Fig. 2 illustrates voltage and current curves typical of the operating conditions occurring in stabilized arc welding systems of the prior art;

Fig. 3 illustrates current and voltage curves typical of operating conditions in the system shown in Fig. 1;

Fig. 4 is a diagrammatic view of a phase shifting circuit which may be used in place of the one shown in Fig. 1; and Fig. 5 is a diagrammatic view of an arc welding system in schematic form illustrating a method of connecting a welding transformer and high frequency generator to a three-phase system in order to secure improved arc stabilization.

Referring to Fig. 1, the reference numeral 10 may denote generally an arc welding system wherein an arc welding circuit 11, including a current limiting reactor 12, an electrode 13, and work 14, may be connected to a relatively low frequency source of alternating current which may be of the usual commercial frequency by means of a welding transformer 16, switch means 17, and conductors 18.

In order to stabilize the welding arc produced between the electrode 13 and work 14, arc stabilizing means in the form of a high frequency generator 19 may be utilized. Such a generator may comprise an oscillatory circuit 20 energized from a control transformer 27 having a primary winding 22 disposed to be connected to a relatively low frequency source of alternating current, and a relatively high voltage secondary winding 23.

In order to produce high frequency discharge impulses for stabilizing the arc, the oscillatory circuit 20 may comprise a capacitor 24 connected in series circuit relation with the primary winding 25 of a high frequency transformer 26 across the secondary winding 23. A gap device 28 may be connected in shunt relation with the capacitor 24 and primary winding 25 to provide a spark discharge wherever the voltage thereacross reaches a predetermined value. The secondary winding 29 of the high frequency transformer may be connected to the arc welding circuit 11 in any suitable manner, being, for example, connected across a suitable air core reactor 30 which may be connected in series circuit relation with a blocking condenser 31 across the arc welding circuit or a portion of it. For example, the secondary winding of the transformer may comprise sections 32 and 33, section 32 being used with reactor 34 and conductor 35 for high current welding at a relatively low voltage whereas sections 32 and 33 may be used with conductor 36 for low current welding at a higher voltage. By connecting the reactor 30 across section 32 of the secondary winding a step up may be given the high frequency when welding with both sections. Suitable filter circuits 37 may be connected between the welding transformer 16 and the control transformer 27 and the source to prevent any high frequency disturbances from reaching the power supply.

In order to secure satisfactory operation of the high frequency generator 19, it is customary to use a control transformer 27 having a relatively high leakage reactance, as the secondary winding 23 is periodically substantially short circuited by the gap device 28, which is designed to break down and discharge the condenser 24 so as to set up high frequency oscillation whenever the gap voltage reaches a predetermined value in each half cycle of the source-voltage-wave. Because of this relatively high leakage reactance, the control transformer produces a substantial phase shift between the primary and secondary voltages. When the control transformer 27 is directly connected to the same source as the winding of the transformer 16, or to a source having a voltage substantially in phase with the voltage applied to the winding transformer 16, the voltage applied by the control transformer 27 to the capacitor 24 and gap device 28 lags the voltage of the arc welding circuit substantially that is, by approximately 60°–90°.

Under these conditions the curves shown in Fig. 2 may be typical of the operating characteristics of such a system. The curve $a$ of Fig. 2 represents the voltage of the arc welding circuit, while the curve $b$ represents the normal phase relation of the arc welding current. The dotted curve $c$ represents the voltage across the secondary winding 23 of the control transformer 27. Accordingly, since the gap device 28 does not break down until the voltage across the secondary winding 23 reaches a predetermined value, the high frequency discharges $d$ produced by the gap device breaking down occur towards the peak of the secondary voltage curve $c$, and they thus occur during the normal peak value of the welding current represented by curve $b$. Under these conditions the arc will probably tend to go out when the arc current reaches the instantaneous zero value. Since the high frequency discharges $d$ do not occur prior to and during the region of normal current zero, the arc will be fairly unstable.

In order to secure the maximum stabilizing effects from the high frequency generator 19, the voltage applied to the primary winding 22 of the control transformer 27 may be so phased relative to the voltage applied to the welding transformer 16 that the secondary voltage applied to the capacitor 24 and the gap device 28 is substantially in phase with the voltage of the arc welding circuit 11, and leads the welding current by approximately 60°–90°. For this purpose phase shifting means 39 may be connected between the control transformer 27 and the source. For example, a capacitor 40 may be connected in series circuit relation with the primary winding 22 between the terminals 41 on one side of the line, for varying the phase relation of the primary voltage to secure the desired phase relation of the high frequency discharges and the arc winding current under different operating conditions. A resistor 42 may be connected across the line between two pairs of terminals 41 having an adjustable tap 43 for controlling the voltage across the primary winding 22 for different degrees of phase shift.

Fig. 3 illustrates voltage and current curves typical of the improved operating conditions secured by practicing my invention. It will be seen that the welding current $b'$ normally lags the welding circuit voltage $a'$ by approximately 60°–90°. The voltage across the gap device 28 $c'$ instead of being substantially in phase with the welding current $b'$ leads the welding current by substantially 60°–90°. Accordingly, the high frequency discharges $d'$ which occur when the voltage $c'$ reaches a predetermined value occur throughout the region of rising arc welding circuit voltage. Since the phase relations of the arc voltage and current vary during welding, it is to be understood that it is the phase relation of the high frequency discharges to the arc current that is important. It is usually preferable to have the discharges commence about 30°–60° prior to the normal instantaneous zero value of the arc welding current and extend throughout a relatively long interval to about 60°–40° subsequent to current zero. Under these conditions it will be seen that the high frequency discharges occur principally prior to and throughout the region of normal current zero in the arc welding circuit, so that stabilization of the arc at this instant when interruption might tend to occur, is effectively provided for. Accordingly, a highly stable arc results.

Referring to Fig. 4, the reference numeral 44 may denote an alternative form of phase shift device for connection between the terminals 41 between the high frequency generator 19 and the source in a manner similar to that shown in Fig. 1. For example, a capacitor 45 may be connected in series circuit relation with a control resistor 46 between the terminals 41 on one side of the line for providing the desired phase relation. The resistor 46 may be provided with an adjustable tap 47 for varying the voltage applied to the high frequency generator in order to secure the proper voltage at the desired phase relation of the high frequency impulses relative to the arc welding circuit under different operating conditions.

Referring to Fig. 5, the reference numeral 48 may denote, generally, an arc welding system wherein an arc welding circuit 11 may be connected to one phase of a three-phase source by means of a welding transformer 16 which is shown schematically for purposes of simplicity. In order to provide the desired phase relation of the high frequency discharges produced by the high frequency generator 19 relative to the voltage and current waves of the arc welding circuit 11, the high frequency generator 19 may be connected to a different phase of the three phase source in such a manner that the voltage applied to the generator 19 leads the voltage applied to the welding transformer by approximately 60°. For example, if the welding transformer 16 is connected to the conductors 49 and 50 of a three-phase source, the high frequency generator 19 may be connected to the conductors 50 and 51 of the source in such a manner as to apply a leading voltage to the generator 19. The high frequency discharges produced by the generator 19 are thereby advanced sufficiently relative to the arc current and voltage to occur prior to and during the time of normal current zero when the arc has the greatest tendency to go out. Improved arc stabilization is thus provided.

From the above description and the accompanying drawing it will be apparent that I have provided in a simple and effective manner for improving the stabilization of the welding arc in an alternating current arc welding system utilizing a high frequency arc stabilizing generator of the gap type. By shifting the phase of the voltage applied to the high frequency generator so that it leads the voltage applied to the welding transformer, the high frequency discharges may be produced prior to and throughout the region of normal instantaneous current zero in the arc welding circuit. Since it is when the arc welding current is in this region that the arc tends to go out, much more stable operation of the arc may be secured by practicing my invention.

Since certain changes may be made in the above description and different embodiments of the invention may be made without departing from the spirit or scope of the invention, it is intended that all the matter contained in the above description or shown in the accompanying drawing shall be considered as illustrative and not in a limiting sense.

I claim as my invention:

1. The combination with an alternating current arc welding circuit, of a high frequency generator producing a series of high frequency pulses during a portion only of each half cycle of an alternating current voltage applied thereto, and circuit means for applying an alternating current voltage to the high frequency generator in such phase relation to the arc welding circuit voltage that high frequency impulses are produced principally between the time that the instantaneous value of arc welding circuit voltage reaches an arc sustaining value and when it is a maximum.

2. The combination with an alternating current arc welding circuit, of a high frequency generator including a resonant circuit and a spark gap connected for supplying high frequency impulses during a portion of each half cycle of the welding current only to the arc welding circuit and a high reactance high voltage transformer connected for energizing the high frequency generator, and circuit means for applying to the said transformer an alternating current voltage of the same frequency as the arc welding circuit and having such a phase relation that the voltage applied to the high frequency generator is substantially in phase with the open circuit welding circuit voltage.

3. The combination with an arc welding transformer having primary and secondary circuits, of a high frequency generator connected to the secondary circuit for applying high frequency impulses only during a portion of each half cycle of the welding circuit voltage and energized from a relatively high leakage reactance transformer having a relatively large phase shift angle, and circuit means including a capacitor and a resistance device connected between the high leakage reactance transformer and the source to shift the phase of the voltage applied by the high leakage reactance transformer to the high frequency generator so that it leads the current in the secondary circuit by substantially 60–90 degrees.

4. The combination with alternating current arc welding apparatus including an arc welding transformer having a primary winding for connection to an alternating current source and a secondary winding for connection to an arc welding circuit, of a high frequency generator connected for applying high frequency impulses to the welding circuit during each half cycle for an interval of less duration than a half cycle of the welding circuit frequency, said generator comprising a step-up transformer having a relatively high leakage reactance and a relatively high phase shift angle and a resonant circuit coupled to the secondary winding of the welding transformer including a capacitor, an inductance and a gap device disposed to break down whenever the applied voltage reaches a predetermined value, and circuit means connecting the high leakage step-up transformer to the source including phase shifting means for so shifting the phase of the voltage applied to the resonant circuit that the gap device breaks down only during the portion of the arc welding circuit voltage wave when the instantaneous welding current passes through the zero value.

5. The combination with a high frequency generator disposed to be energized by a high leakage reactance transformer from a relatively low frequency source for periodically producing a series of high frequency impulses each time the voltage produced by the transformer exceeds a predetermined minimum value during a portion only of each half cycle for stabilizing an arc welding circuit disposed to be energized from a 60 cycle source, of circuit means including a condenser connected in series circuit relation with the high leakage reactance transformer for applying a voltage to the generator substantially in phase with the arc welding circuit voltage, and a control resistor connected in shunt with the transformer.

CLINTON L. DENAULT.